United States Patent
Bigler et al.

(10) Patent No.: US 6,587,328 B2
(45) Date of Patent: Jul. 1, 2003

(54) BELLOWS WITH A UNIFORM ELECTRIC CONDUCTIVE LAYER FOR A VACUUM CAPACITOR

(75) Inventors: Walter Bigler, Heitenried (CH); Bernhard Hug, Bümpliz (CH)

(73) Assignee: Comet Technik AG, Liebefeld (CH)

( * ) Notice: Subject to any disclaimer, the term of this patent is extended or adjusted under 35 U.S.C. 154(b) by 0 days.

(21) Appl. No.: 09/959,775
(22) PCT Filed: Mar. 7, 2001
(86) PCT No.: PCT/CH01/00141
§ 371 (c)(1), (2), (4) Date: Nov. 7, 2001
(87) PCT Pub. No.: WO01/67472
PCT Pub. Date: Sep. 13, 2001

(65) Prior Publication Data
US 2002/0159221 A1 Oct. 31, 2002

(30) Foreign Application Priority Data
Mar. 8, 2000 (CH) .................................. 449/00

(51) Int. Cl.$^7$ .......................... H01G 4/02; H01G 5/013
(52) U.S. Cl. ...................................... 361/326; 361/279
(58) Field of Search ................................ 361/277–279, 361/280, 283.1–283.4, 290–292, 326; 29/25.42

(56) References Cited

U.S. PATENT DOCUMENTS
4,002,957 A * 1/1977 Weisbrod .................. 361/271
6,268,995 B1 * 7/2001 Beuerman et al. ......... 361/277

FOREIGN PATENT DOCUMENTS
JP 6-204082 7/1994
JP 7-78729 * 3/1995 ............ H01G/5/01

* cited by examiner

Primary Examiner—Dean A. Reichard
Assistant Examiner—Eric Thomas
(74) Attorney, Agent, or Firm—Burns, Doane, Swecker & Mathis, L.L.P.

(57) ABSTRACT

The invention relates to a bellows in a vacuum capacitor, whose bellows structure (1) comprises a carrier material (2) and at least one electrically conductive layer (5, 6), whereby the latter has a uniform thickness over the entire bellows structure. The deviations of the layer thickness from the mean are less than ±50% and preferably less than ±10%. This results in an increased life span with mechanical loading. In order to increase the heat emission through radiation, the bellows structure (1) has an additional dark layer (7). The used method provides for the application of the electrically conductive layers prior to the shaping process, which results in homogeneous layer thicknesses.

11 Claims, 2 Drawing Sheets

BELLOWS WITH A UNIFORM ELECTRIC CONDUCTIVE LAYER FOR A VACUUM CAPACITOR

FIELD OF THE INVENTION

The invention relates to a bellows for a vacuum capacitor with a uniform electrically conductive layer as well as to a method for the production of the bellow.

BACKGROUND OF THE INVENTION

Bellows structures are used in variable vacuum capacitors where, as a mechanical part, in addition to electrical properties, they must fulfill a sealing function. They must be HF-conductive, i.e., have good high-frequency conductivity and withstand a mechanical and thermal continuous load, which represent the long-time properties of a vacuum capacitor.

Over time, known bellows of bronze and other alloys experience material fatigue and often do not fulfill the requirements with respect to life span.

JP-06204082-A discloses a vacuum capacitor that uses a stainless steel bellows with a copper or silver coating to improve the electrical properties. As known, previously used processes for coating the bellows result in very different layer thicknesses because of inhomogeneous flow distribution during the coating process. These uneven layer thicknesses are disadvantageous with respect to electrical loading capacity as well as life span, since the locally elevated bending forces during application of mechanical loads result in material fatigue or breakage, first of the layer and later of the carrier material.

SUMMARY OF THE INVENTION

It is the objective of the invention to describe a bellows for a vacuum capacitor that consists of a carrier material and at least one applied layer, of which at least one is constructed in an electrically conductive manner and is characterized by the most uniform layer thickness possible. The homogeneity of the layer achieves a longer life span. Another objective of the invention is the production of such a bellows.

According to the invention, this objective is realized with a bellows for a vacuum capacitor and with a method for producing the bellows for a vacuum capacitor.

BRIEF DESCRIPTION OF THE DRAWINGS

The invention is described below in reference to figures, whereby.

DETAILED DESCRIPTION OF THE INVENTION

Figure 1:
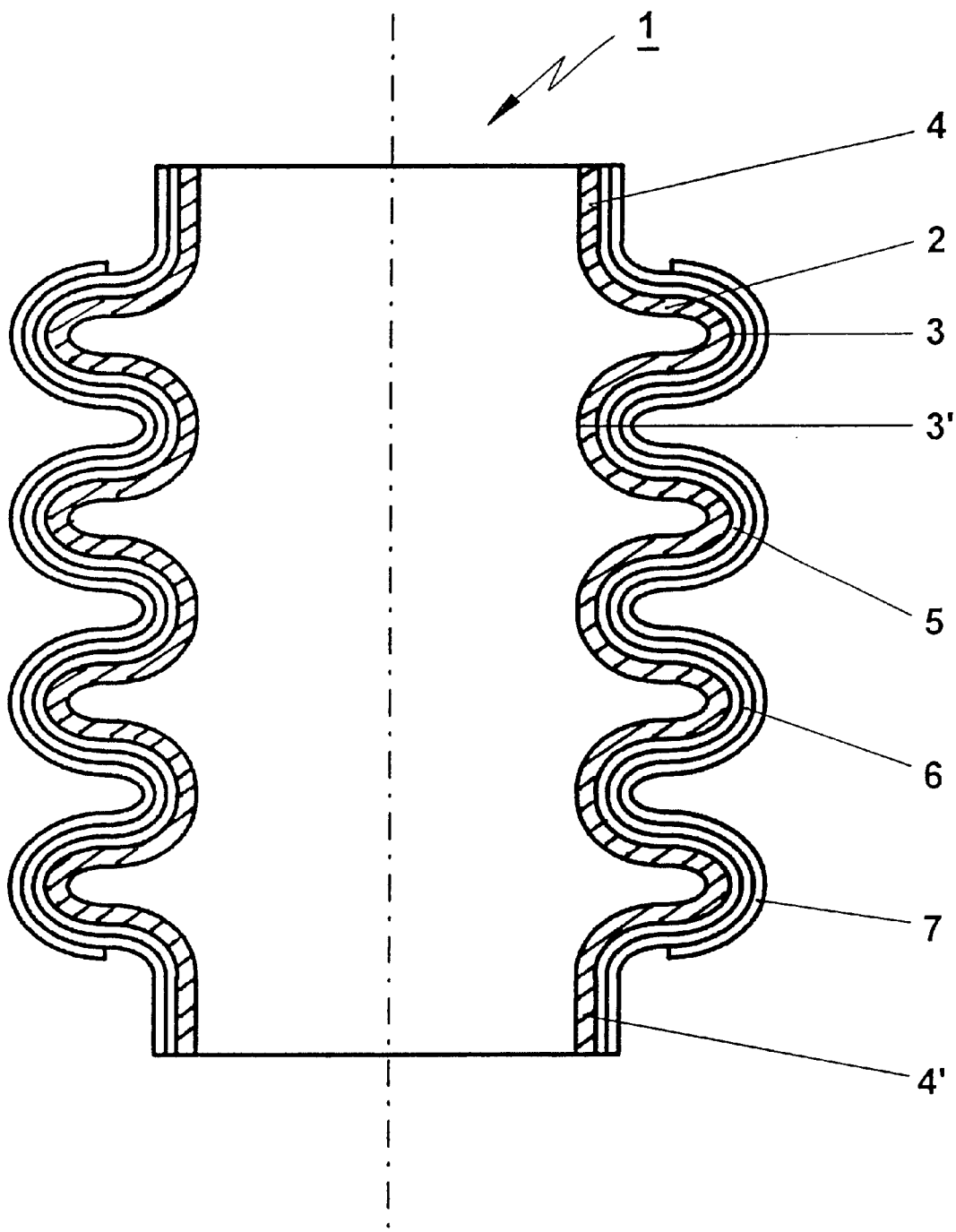
FIG. 1 shows a schematic drawing of a section of the bellows.

FIG. 1 shows a schematic drawing of a section of a bellows. A bellows structure 1 of a carrier material 2 is provided with a standard rib structure having external and internal folds 3 and 3' and cylindrically constructed connection parts 4 and 4'.

On the bellows structure are located electrically conductive layers 5 and 6, which have been provided for their adhesion-promoting or electrical properties.

As a suitable carrier material, pipes of stainless steel or Ni alloys with at least 65% nickel are suitable.

Layer 5, for example, has, in addition to a conductive property, an adhesion-promoting property with respect to layer 6.

Layer 5 consists, for example, of nickel, gold, or their alloys, with a typical thickness of 0.2–5 μm.

The electrically conductive layer 6 consists, for example, of copper, silver, gold, palladium, or their alloys, whereby their thickness is 1–50 μm, preferably 25 μm. Layer 5 also may be absent so that only layer 6 lies on top of the carrier material.

In no way is the number of electrically conductive layers limited to two. It is, for example, possible to apply another layer, as may be the case with a thin gold layer of 0.2 to 0.9 μm.

An important property of layer 6 is its uniform layer thickness that is achieved with a shaping described later on.

Layer 6 is provided with another layer 7 that is produced, for example, by black chrome plating or a copper oxide that improves the thermal emission behavior of the surface and causes the entire or partial external surface of the bellows structure to appear as a black body. It was found that this significantly promotes the heat emission through radiation, which results in lower operating temperatures of the bellows and has a very advantageous effect on current loading capacity and life span.

By constructing layer 7 with a rough surface, this advantageous effect is increased, which may be achieved, for example, by sandblasting, brushing or chemical processes. Layer 7 covers the rib structure or parts thereof, but not necessarily the areas of the connection parts 4, 4'.

The following describes the method for producing such a bellows. Starting with a pipe as a carrier material, consisting preferably of stainless steel, at least one electrically conductive layer 5, 6 is applied to it, for example, galvanically.

While the wall thicknesses of the pipes are approximately 50 to 200 μm, the layer thicknesses, depending on their function, range generally from 1 to 50 μm.

After application of these layers 5, 6, a composite part, or, respectively, a composite pipe, is formed, and subjected in the known manner to a shaping process, creating the bellows structure 1.

With such a shaping, the layer thicknesses of the composite pipe remain essentially uniform. It was found that the deviations of the layer thickness from the mean are less than ±10%. Compared to galvanic application of the layer following application, this uniformity presents a great advantage.

The shaping according to the invention results in a bellows structure that is finished, which may be accomplished by applying another layer 7 for further improvement, followed by cleaning steps, etc. The additional layer 7 also may be applied prior to the shaping.

The finishing also may consist of mechanically bringing the connection parts 4, 4' into optimum shape.

After this, the bellows is ready to be installed and is mounted in a vacuum capacitor.

Alternatively to a galvanic coating for applying the electrically conductive layers, at least one other very thin pipe is pulled or slipped over the carrier material or first pipe, after which the shaping step is performed. The finishing of the bellows structure takes place in a similar way as already described.

Figure 2:
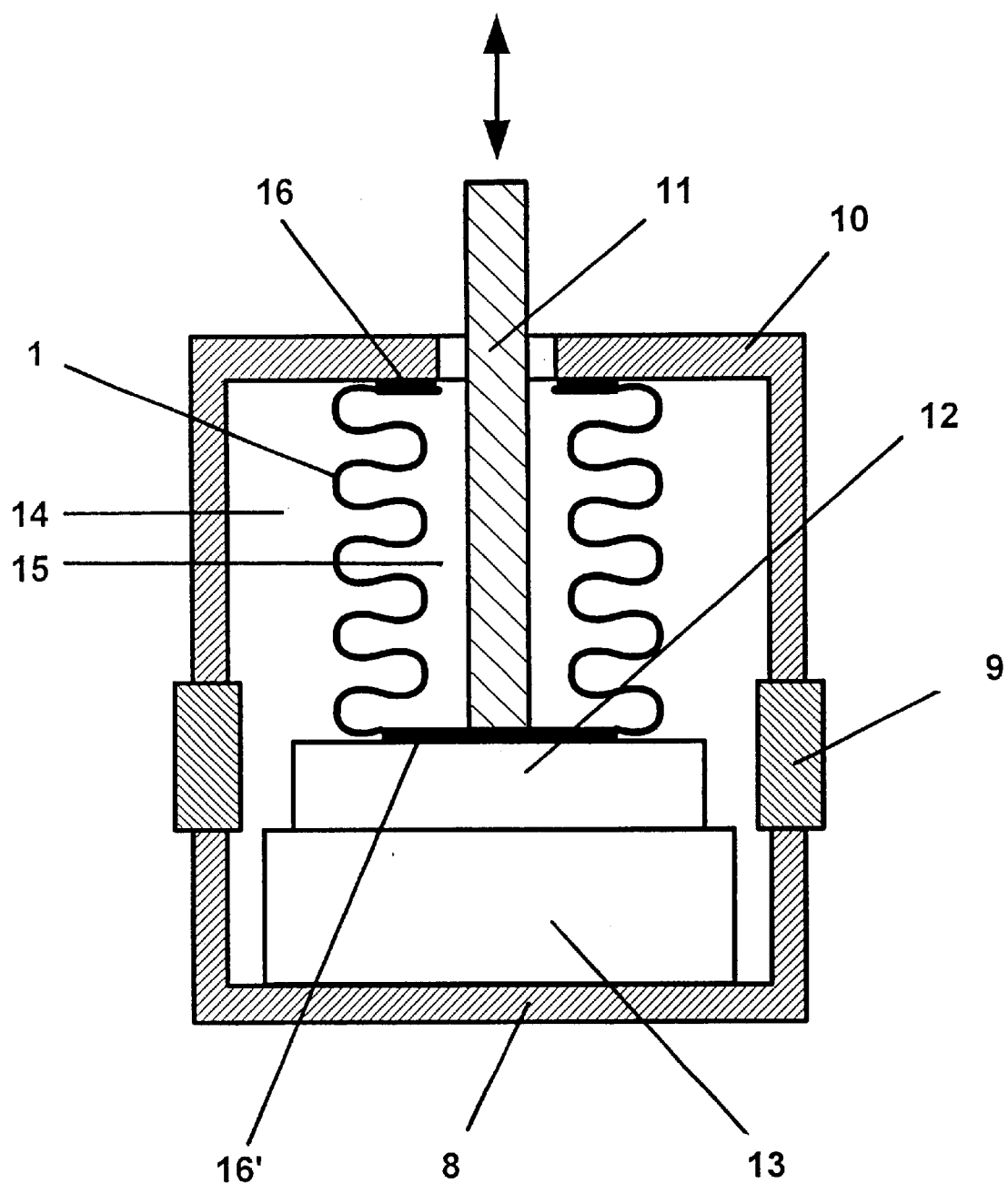
FIG. 2 shows a schematic drawing of a section of a vacuum capacitor.

FIG. 2 shows the schematic drawing of a variable vacuum capacitor. A fixed electrode block 13 is connected mechanically and electrically with the lower part 8 of the housing that simultaneously represents an external, electrical connection of the capacitor. The lower part 8 of the housing is tightly connected with the upper part 10 of the housing via a ring-shaped insulator 9. Via a bar 11 that is attached at its lower end to a variable electrode block 12, the latter is immersed from the outside more or less deeply into the fixed electrode block 13, so that the desired capacity can be set. In order to improve the electrical properties, the inner space 14 has a vacuum that is separated from the ambient pressure 15 by a bellows, for example a spring bellows 1. The spring bellows is connected in a gas-tight manner at one end 16 with the upper part 10 of the housing, and at the other end 16' with the variable electrode block 12. The spring bellows ensures a high vertical mobility of the bar 11 and of the variable electrode block 12, and at the same time is designed so that it withstands the pressure differential between the internal space 14 and the ambient pressure 15. The spring bellows 1 hereby also has a high HF-electrical conductivity, through which the variable electrode block 12 is connected with the second electrical connection 10.

The advantages of the uniform layer thickness according to the invention are the resulting regular current line and current density progression, resulting in a uniform temperature load and prevention of local overheating. Even the thinner areas of the electrically conductive layer still ensure sufficient current conduction.

Another advantage of the uniform layer thickness according to the invention is the regular mechanical load applied to the bellows structures. This results in a clearly improved life span of the bellows and thus permits a significantly higher number of cycles of the bellows and thus of the vacuum capacitor. This is significant when the capacity range is utilized.

The examples described below show the homogeneity of the layer thicknesses that can be achieved and demonstrate the clearly improved life span.

EXAMPLE 1

Copper-plated Spring Bellows of Stainless Steel

In order to improve the adhesiveness, a stainless steel pipe with a thickness of 100 μm was first coated with a 0.8 μm thick layer of gold, followed by a 25 μm thick conductive layer of copper. The pipe prepared in this manner was then shaped according to a known process into a bellows structure and installed in a vacuum capacitor according to FIG. 2. Temperature measurements under a high-frequency current load at 13.5 MHz showed that a vacuum capacitor produced in this manner is just as good or better than a known vacuum capacitor with a bronze bellows with respect to its electrical loading capacity. This means that the regularity of the layer thicknesses corresponds to that of a homogeneous metallic conductor. Measuring of the layer thickness has shown that the deviations of the layer thickness from the mean were less than ±10%.

EXAMPLE 2

Spring Bellows with Improved Heat Radiation

A 20 μm thick conductive layer of copper was applied to a 80 μm thick stainless steel pipe. In order to improve the adhesiveness, a layer of Ni with a thickness of 1.3 μm was chosen. The pipe prepared in this manner was then shaped according to a known process and installed into a vacuum capacitor according to FIG. 2. In order to improve the heat radiation, another layer in the form of a dark copper oxide layer with a thickness of 1.0 μm was applied. Compared to example 1, temperature measurements were performed under a current load of 40 MHz. It was found that a vacuum capacitor produced in this manner and provided with another layer is able to withstand higher loads.

Long-term life span tests have shown that with a cyclical, axial loading of the bellows according to the invention, the life span can be at least doubled compared to spring bellows with other typical materials, such as, e.g., bronze.

EXAMPLE 2

Spring Bellows with Improved Heat Radiation

A 20 μm thick conductive layer of copper was applied to a 80 μm thick stainless steel pipe. In order to improve the adhesiveness, a layer of Ni with a thickness of 1.3 μm was chosen. The pipe prepared in this manner was then shaped according to a known process and installed into a vacuum capacitor according to FIG. 2. In order to improve the heat radiation, another layer in the form of a dark copper oxide layer with a thickness of 1.0 μm was applied. Compared to example 1, temperature measurements were performed under a current load of 40 MHz. It was found that a vacuum capacitor produced in this manner and provided with another layer is able to withstand higher loads.

Long-term life span tests have shown that with a cyclical, axial loading of the bellows according to the invention, the life span can be at least doubled compared to spring bellows with other typical materials, such as, e.g., bronze.

What is claimed is:

1. A bellows for a vacuum capacitor comprising: a bellows structure comprising a carrier material and at least one layer, of which at least one layer is constructed in an electrically conductive manner and has a uniform thickness over the entire bellows structure, wherein the carrier material is a Ni alloy, whereby the Ni alloy contains at least 65% nickel.

2. A bellows for a vacuum capacitor as claimed in claim 1, wherein the at least one electrically conductive layer is selected from the group consisting of silver, gold, palladium, or their alloys, whereby the at least one electrically conductive layer has a thickness of 1–50 μm and wherein deviations of the thickness of the at least one electrically conductive layer from a mean are less than ±10%.

3. A bellows for a vacuum capacitor comprising: a bellows structure comprising a carrier material and at least one layer, of which at least one layer is constructed in an electrically conductive manner and has a uniform thickness over the entire bellows structure, wherein the at least one electrical conductive layer is provided with at least one additional layer that supports heat radiation and covers the bellows structure in its entirety or in part.

4. A bellows for a vacuum capacitor comprising: a bellows structure comprising a carrier material and at least one layer, of which at least one layer is constructed in an electrically conductive manner and has a uniform thickness over the entire bellows structure, wherein the at least one layer is selected from the group consisting of black chrome plating or a copper oxide layer and is constructed essentially as a black body, and wherein a thickness of the at least one additional layer is 0.1–10 μm.

5. A bellows for a vacuum capacitor as claimed in claim 4, wherein the thickness of the at least one additional layer is 2 μm.

6. A bellows for a vacuum capacitor comprising: a bellows structure comprising a carrier material and at least one layer, of which at least one layer is constructed in an electrically conductive manner and has a uniform thickness over the entire bellows structure, wherein the at least one layer has a rough surface.

7. A method for producing a bellows for a vacuum capacitor wherein a pipe is a carrier material, the method comprising: applying at least one electrically conductive layer onto the pipe; shaping the pipe that has been provided and coated with the layer in this manner thereby forming a bellows structure; finishing the bellows structure; and mounting the bellows structure in a vacuum capacitor.

8. A method as claimed in claim 7, wherein the at least one electrically conductive layer comprises at least one additional pipe of at least one additional material with which the carrier material is coated resulting in a composite pipe, whereby a wall thickness of the at least one additional pipe is less than that of the carrier material.

9. A method as claimed in claim 7, wherein during the operation of finishing of the shaped pipe at least one additional layer for increasing heat emission through radiation is applied and where the at least one additional layer covers the at least one electrically conductive layer below the at least one additional layer in the entirety or partially of the at least one additional layer.

10. A method as claimed in claim 7, wherein at least one additional layer for increasing heat emission through radiation is applied prior to the shaping.

11. A method as claimed in claim 7, wherein at least one additional layer is applied as a black chrome plating or as a copper oxide layer.

* * * * *